Aug. 26, 1924.

R. SATO ET AL 1,506,670

WALKING ANIMAL TOY

Filed April 22, 1921    2 Sheets-Sheet 1

Ryuji Sato,
Umekichi Ito.
INVENTOR

BY Victor J. Evans
ATTORNEY

WITNESS: Jev. Ely.

Aug. 26, 1924.

R. SATO ET AL 1,506,670

WALKING ANIMAL TOY

Filed April 22, 1921   2 Sheets-Sheet 2

Ryuji Sato,
Umekichi Ito,
INVENTOR

BY Victor J. Evans
ATTORNEY

WITNESS:

Patented Aug. 26, 1924.

1,506,670

UNITED STATES PATENT OFFICE.

RYUJI SATO, OF NEW YORK, AND UMEKICHI ITO, OF BRONX, NEW YORK.

WALKING ANIMAL TOY.

Application filed April 22, 1921. Serial No. 463,553.

*To all whom it may concern:*

Be it known that we, RYUJI SATO and UMEKICHI ITO, citizens of Japan, residing at New York city and Bronx, respectively, in the counties of New York and Bronx, respectively, and State of New York, have invented new and useful Improvements in Walking Animal Toys, of which the following is a specification.
This invention relates to walking animal toys, and one of the objects is to provide mechanism whereby upon successive impulses given to a cord connected with the figure of an animal, the figure may be made to move its legs for effecting walking along a surface upon which it may be placed.

Another object is to provide means whereby upon pulling the said cord, the rear leg on one side of the animal and the fore leg on the opposite side may be advanced to take a step; and upon releasing the cord, the other rear and fore legs may be advanced automatically for taking the next step.

Another object is to provide the legs with spring joints for permitting them to give natural and life like movements.

Another object is to produce a device of this nature which shall be simple of construction, cheap to manufacture, and highly efficient for the purpose for which it is designed.

With these and other objects in view, the invention resides in certain novel features of construction and combination and arrangement of parts, the essential features of which are hereinafter fully described, are particularly pointed out in the appended claims and are illustrated in the accompanying drawing, in which:—
Figure 1 is a normal side elevation of a toy animal embodying our invention, parts being broken away for the sake of clearness.

Like characters of reference refer to like parts in all views.

Figure 1:
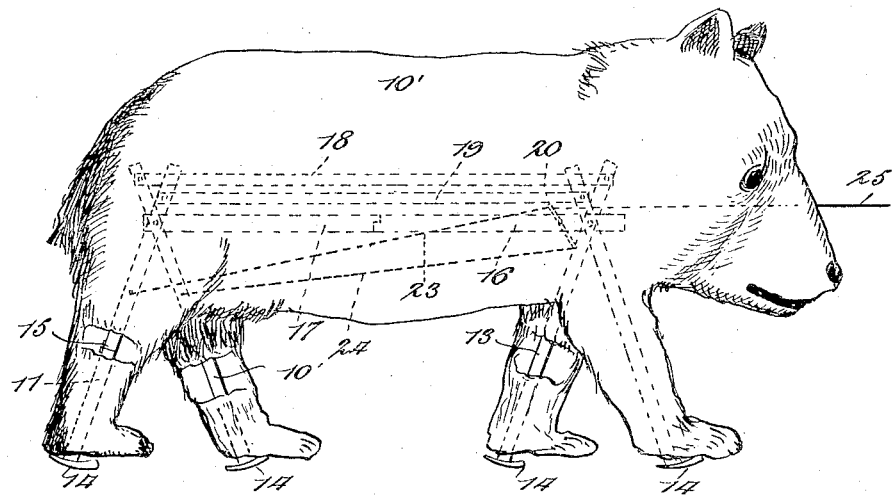
Figure 3:
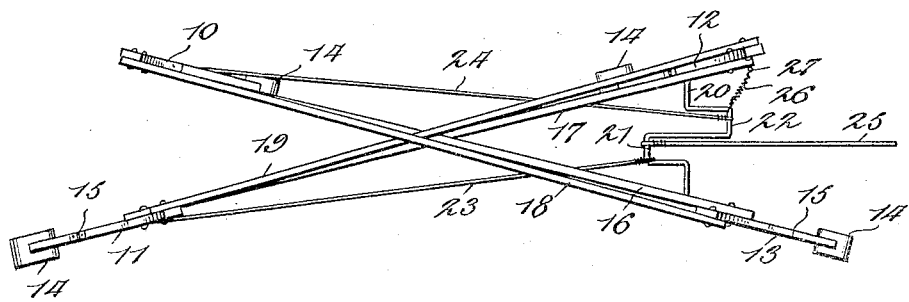
Figure 3 is a top plan view of the walking mechanism in the normal position.
Figure 2:
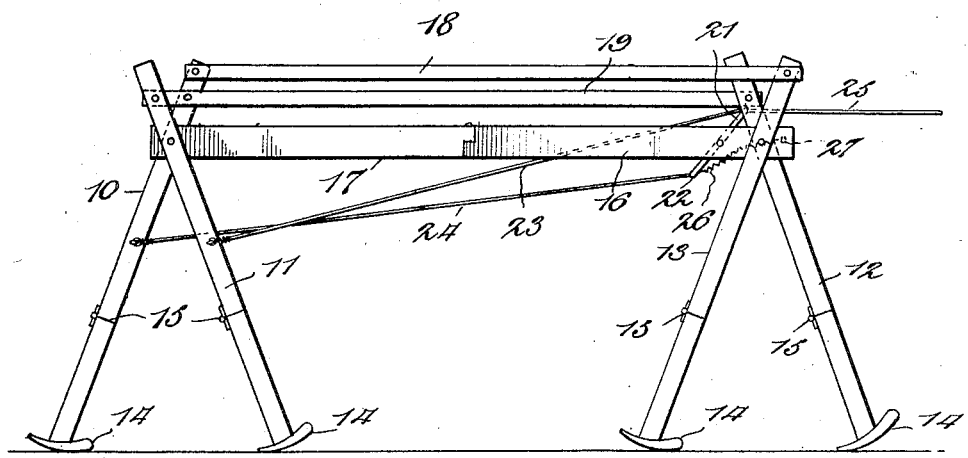
Figure 2 is a similar view with parts in the position they assume when the cord is drawn forward.
Figure 4:
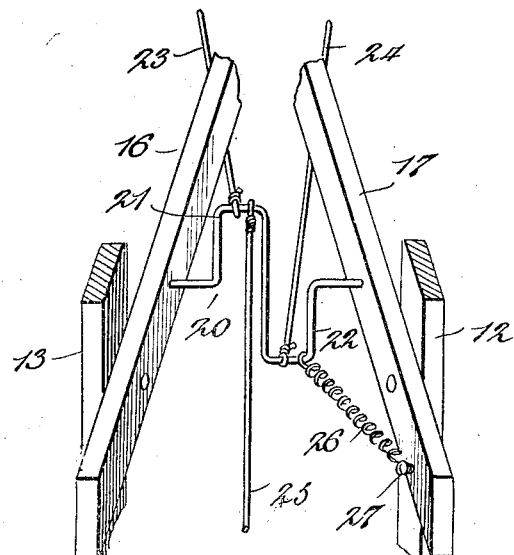
Figure 4 is a fragmentary detail perspective view of the front portion of the walking mechanism.

Referring to the drawing in detail, 10 represents the outer covering of the device which may be given the shape of any desired animal. The material is preferably flexible at least at such points as require it for permitting free movement of the legs. The rear legs are provided with bars 10 and 11 and the front legs with bars 12 and 13, respectively, each leg terminating in a foot 14 which is curved on its bottom and roughened at the rear part as shown; and each of the legs and its bar is provided with a spring hinge or joint at the knee as shown at 15.

Two bars 16 and 17 extend diagonally through the length of the animal forming an X. The legs bars 11 and 12 are pivoted near opposite ends of bar 17; and leg bars 10 and 13 are similarly pivoted to bar 16. All of the leg bars extend above the members 16 and 17 and bars 10 and 13 are connected to each other by a link 18, while bars 11 and 12 are connected by a link 19.

A member 20 is pivoted between bars 16 and 17 near their front ends and is formed with upper and lower cranks 21 and 22. A line 23 passes from the upper crank 21 to the bar 11, and a line 24 passes from the lower crank 22 to the leg bar 10. A pull cord 25 attaches to the upper crank 21 and passes out through the collar of the animal so as to appear as a leading line for the animal. A spring 26 is connected to the lower crank 22 at one end and to a stud 27 secured in the front portion of member 17. This spring tends constantly to hold the leg bars 10 and 13 with the feet 14 thereof advanced. Upon pulling on cord 25, the member 20 will be turned on its pivot so that upper crank 21 and cord 23 will advance leg members 11 and 12 to position for taking the next step. Upon release of the string, the spring 26 will return the parts to normal, thereby moving the animal forward on legs 11 and 12, and advancing legs 10 and 13. The joints in the legs permit the necessary flexing of the various members as required.

It will thus be seen that the figure by a succession of pulls on the cord 25 will be advanced by steps, each step being effected by the forward movement of one of the hind legs and the fore leg on the opposite side of the animal.

While we have described what we deem to be the most desirable embodiments of our invention, it is obvious that many of the details may be varied without departing from the spirit of our invention, and we therefore do not limit ourselves to the exact details of construction herein set forth nor to anything less than the whole of our invention limited only by the appended claims.

What is claimed as new is:—

1. A toy animal comprising a body portion, a framework secured in said body portion, a pair of front leg members pivoted at one end of said framework, a pair of rear leg members pivoted at the opposite end of said framework, a link for each rear leg member and pivotally connected thereto and to the opposite front leg member, a double crank member pivoted to said framework, means connecting each of the cranks of said crank member with a respective one of said rear leg members, a manipulating device connected to one of said cranks and a spring connected to the other of said cranks.

2. A toy animal comprising a body portion, a framework secured in said body portion, a pair of front leg members pivoted at one end of said framework, a pair of rear leg members pivoted at the opposite end of said framework, all of said leg members being jointed, a link for each rear leg member and pivotally connected thereto and to the opposite front leg member, a double crank member pivoted to said framework, means connecting each of the cranks of said crank member with a respective one of said rear leg members, a manipulating device connected to one of said cranks and a spring connected to the other of said cranks.

3. A walking toy comprising a body, a frame-work mounted in said body, a pair of front legs and a pair of rear legs pivotally mounted on said frame-work, a link connecting each front leg bar with the opposite rear leg bar, a double crank mounted in the forward end of said frame-work, means connecting each crank with a rear leg, yieldable means attached to one crank and to the frame-work and a manipulating device secured to the other of said cranks as and for the purpose specified.

In testimony whereof we have affixed our signatures.

RYUJI SATO.
UMEKICHI ITO.